US012252667B2

(12) United States Patent
Pechera et al.

(10) Patent No.: US 12,252,667 B2
(45) Date of Patent: Mar. 18, 2025

(54) LAUNDRY DETERGENT COMPOSITION

(71) Applicant: Church & Dwight Co., Inc., Princeton, NJ (US)

(72) Inventors: Leilani Pechera, Kendall Park, NJ (US); Steven Adamy, Lawrenceville, NJ (US); Archana Gupta, Belle Mead, NJ (US)

(73) Assignee: Church & Dwight Co., Inc., Princeton, NJ (US)

( * ) Notice: Subject to any disclaimer, the term of this patent is extended or adjusted under 35 U.S.C. 154(b) by 343 days.

(21) Appl. No.: 17/917,451

(22) PCT Filed: Apr. 6, 2021

(86) PCT No.: PCT/US2021/025862
§ 371 (c)(1),
(2) Date: Oct. 6, 2022

(87) PCT Pub. No.: WO2021/207117
PCT Pub. Date: Oct. 14, 2021

(65) Prior Publication Data

US 2023/0183619 A1 Jun. 15, 2023

Related U.S. Application Data

(60) Provisional application No. 63/006,438, filed on Apr. 7, 2020.

(51) Int. Cl.

| | |
|---|---|
| ***C11D 1/00*** | (2006.01) |
| ***C11D 1/83*** | (2006.01) |
| ***C11D 3/10*** | (2006.01) |
| ***C11D 3/20*** | (2006.01) |
| ***C11D 3/386*** | (2006.01) |
| ***C11D 3/43*** | (2006.01) |
| ***C11D 11/00*** | (2006.01) |
| ***C11D 17/04*** | (2006.01) |
| *C11D 1/14* | (2006.01) |
| *C11D 1/66* | (2006.01) |

(52) U.S. Cl.
CPC .............. *C11D 17/043* (2013.01); *C11D 1/83* (2013.01); *C11D 3/10* (2013.01); *C11D 3/2065* (2013.01); *C11D 3/2093* (2013.01); *C11D 3/38618* (2013.01); *C11D 3/38636* (2013.01); *C11D 3/43* (2013.01); *C11D 11/0094* (2013.01); *C11D 1/146* (2013.01); *C11D 1/662* (2013.01); *C11D 2111/12* (2024.01)

(58) Field of Classification Search
None
See application file for complete search history.

(56) References Cited

U.S. PATENT DOCUMENTS

| | | | |
|---|---|---|---|
| 4,973,416 | A | 11/1990 | Kennedy |
| 6,387,864 | B1 | 5/2002 | Bartelme |
| 6,521,581 | B1 | 2/2003 | Hsu et al. |
| 6,632,785 | B2 | 10/2003 | Pfeiffer et al. |
| 7,056,876 | B2 | 6/2006 | Shamayeli |
| 7,424,891 | B2 | 9/2008 | Gentschev et al. |
| 7,557,075 | B2 | 7/2009 | Fregonese et al. |
| 7,781,506 | B2 | 8/2010 | Urian et al. |
| 7,915,213 | B2 | 3/2011 | Adamy et al. |
| 7,967,220 | B2 | 6/2011 | Hansen et al. |
| 8,669,220 | B2 | 3/2014 | Huber et al. |
| 8,865,638 | B2 | 10/2014 | Adamy |
| 9,187,714 | B2 | 11/2015 | Schmiedel et al. |
| 2002/0033004 | A1 | 3/2002 | Edwards et al. |
| 2006/0281658 | A1 | 12/2006 | Kellar et al. |
| 2007/0157572 | A1 | 7/2007 | Dehms et al. |
| 2010/0189707 | A1 | 7/2010 | Barnett |
| 2010/0196287 | A1 | 8/2010 | O'Connell et al. |
| 2012/0097193 | A1 | 4/2012 | Rossetto et al. |
| 2013/0065811 | A1 | 3/2013 | Fernandez-Prieto et al. |
| 2013/0206638 | A1 | 8/2013 | Wong et al. |
| 2015/0038594 | A1 | 2/2015 | Borges et al. |
| 2015/0232787 | A1* | 8/2015 | Adamy ................ C11D 3/3917 510/375 |
| 2016/0024446 | A1 | 1/2016 | Lee et al. |
| 2019/0055499 | A1 | 2/2019 | Maes et al. |

FOREIGN PATENT DOCUMENTS

| | | |
|---|---|---|
| CA | 1112534 | 11/1981 |
| EP | 0158464 | 10/1985 |
| EP | 234867 | 9/1987 |
| EP | 0497026 | 8/1992 |
| EP | 2155867 | 10/2015 |
| JP | 61-151029 | 6/1986 |
| JP | 61151032 | 6/1986 |
| WO | 2016134088 | 8/2016 |
| WO | 2019/123343 | 6/2019 |
| WO | 2020/247351 | 12/2020 |

* cited by examiner

*Primary Examiner* — Necholus Ogden, Jr.
(74) *Attorney, Agent, or Firm* — Church & Dwight Co., Inc.

(57) ABSTRACT

An article is provided including an aqueous liquid detergent; and a package for the aqueous liquid detergent which is in direct contact with the aqueous liquid detergent, wherein the package is formed from a water-soluble, film-forming material. The aqueous liquid detergent includes: at least about 40% by weight of water based on the total weight of the aqueous liquid detergent; a builder comprising potassium carbonate, wherein the potassium carbonate is present in an amount of at least about 25 weight percent, based on the total weight of the aqueous liquid detergent; propylene glycol diacetate; and at least one surfactant.

18 Claims, No Drawings

LAUNDRY DETERGENT COMPOSITION

CROSS-REFERENCE TO RELATED APPLICATIONS

The present application is a U.S. National Stage of International Patent Application PCT/US2021/025862 filed Apr. 6, 2021 and claims priority to U.S. Provisional Patent Application No. 63/006,438 filed Apr. 7, 2020. The disclosures of each of the applications noted above are incorporated herein by reference in their entirety.

FIELD OF THE INVENTION

The present invention relates to compositions for use in laundry machines, and more particularly to a liquid detergent composition.

BACKGROUND

This invention relates to high water content liquid laundry detergents in unit dosage form in a package comprising a water-soluble, film-forming material.

The use of water-soluble film packages to deliver unit dosage amounts of laundry products is well known. Granular detergents and granular bleaches have been sold in this form in the United States for many years. A compact granular detergent composition in a water-soluble film pouch has been described in Japanese Patent Application No. 61-151032, filed Jun. 27, 1986, which is incorporated herein by reference. A paste detergent composition packaged in a water-soluble film is disclosed in Japanese Patent Application No. 61-151029, also filed Jun. 27, 1986. Further disclosures relating to detergent compositions which are either pastes, gels, slurries, or mulls packaged in water-soluble films can be found in U.S. Pat. No. 6,632,785 to Pfeiffer et al., U.S. Pat. No. 8,669,220 to Huber et al., and 8,865,638 to Adamy et al.; U.S. Pat. App. Pub. Nos. 2002/0033004 to Edwards et al., 2007/0157572 to Oehms et al., and 2012/0097193 to Rossetto et al.; Canadian U.S. Pat. No. 1,112,534 issued Nov. 17, 1981; and European Patent Application Nos. 158464 published Oct. 16, 1985 and 234867, published Sep. 2, 1987; each of which is incorporated herein by reference. A liquid laundry detergent containing detergents in an aqueous solution is disclosed in U.S. Pat. No. 4,973,416 to Kennedy, U.S. Pat. No. 6,521,581 to Hsu et al., U.S. Pat. No. 7,424,891 to Gentschev et al., and 7,557,075 to Fregonese et al.; and U.S. Pat. Pub. Nos. 2013/0065811 to Fernandez-prieto et al., and 2013/0206638 to Wong et al.; which are herein incorporated by reference. See, also, U.S. Pat. No. 6,387,864 to Bartelme et al., U.S. Pat. No. 7,056,876 to Shamayeli et al., U.S. Pat. No. 7,915,213 to Adamy et al., and 9,187,714 to Schmiedel et al.; and U.S. Pat. App. Pub. No. 2006/0281658 to Kellar et al., which disclose high builder compositions in pods and are herein incorporated by reference.

It is generally believed that high water content liquid laundry detergents are incompatible with water-soluble films because of their water content. Thus, the attendant advantages of high water content liquid laundry detergents over other forms of laundry detergents such as granules, pastes, gels, and mulls have not been readily available in water-soluble unit dosage form. The advantages of liquid laundry detergents over granules, pastes, gels, and mulls include their aesthetic appearance and the faster delivery and dispersibility of the detergent ingredients to the laundry wash liquor, especially in a cool or cold water washing process.

The use of a water-soluble alkaline carbonate builder in the detergent composition can help prevent the aqueous detergent composition from dissolving the water-soluble package material. Laundry detergent compositions comprising a water-soluble alkaline carbonate are well-known in the art. For example, it is conventional to use such a carbonate as a builder in detergent compositions which supplement and enhance the cleaning effect of an active surfactant present in the composition. Such builders improve the cleaning power of the detergent composition, for instance, by the sequestration or precipitation of hardness causing metal ions such as calcium, peptization of soil agglomerates, reduction of the critical micelle concentration, and neutralization of acid soil, as well as by enhancing various properties of the active detergent, such as its stabilization of solid soil suspensions, solubilization of water-insoluble materials, emulsification of soil particles, and foaming and sudsing characteristics. Other mechanisms by which builders improve the cleaning power of detergent compositions are less well understood. Builders are important not only for their effect in improving the cleaning ability of active surfactants in detergent compositions, but also because they allow for a reduction in the amount of the surfactant used in the composition, the surfactant being generally much more costly than the builder.

Sodium carbonate ($Na_2CO_3$) and/or potassium carbonate ($K_2CO_3$) are the most common carbonates included in laundry detergents to impart increased alkalinity to wash loads, thereby improving detergency against many types of soils. In particular, soils having acidic components e.g. sebum and other fatty acid soils, respond especially well to increased alkalinity.

While laundry detergents containing a relatively large amount of carbonate builder are generally quite satisfactory in their cleaning ability, the use of such carbonate builders often results in the problem of calcium carbonate precipitation, which may give rise to fabric encrustation due to the deposition of the calcium carbonate on the fiber surfaces of fabrics which in turn causes fabric to have a stiff hand and gives colored fabrics a faded appearance. Thus, any change in available carbonate built laundry detergent compositions which reduces their tendency to cause fabric encrustation is highly desirable.

In many applications, it is desirable to include $Na_2CO_3$ and $K_2CO_3$ in detergent formulations at levels greater than 20%. This is readily achieved in the case of a powdered detergent. However, incorporating such large amounts into an aqueous liquid is much more difficult. In liquid laundry detergent compositions, the incorporation of a large amount of detergent builder poses a significant formulation challenge since the presence of a major quantity of detergent builder inevitably causes the detergent composition to phase separate. Liquid detergent formulations that contain a detergent builder ingredient require careful control of the surfactant to builder ratio so as to prevent salting-out of the surfactant phase. Liquid laundry detergent compositions are also susceptible to instability under extended freeze/thaw and high/low temperature conditions.

Additionally, sodium carbonate forms an extensive array of low water soluble hydrates at low temperatures and high, i.e., >15 wt. % levels of the sodium carbonate builder. For example, a system with 20% carbonate builder will form a decahydrate phase below: 23° C. At 30% sodium carbonate, the decahydrate will form below 31° C. Therefore, even at room temperature, systems containing greater than 20% carbonate builder are inherently unstable and readily form decahydrate phases. Once the decahydrate forms, redissolution can take an inordinate amount of time.

Accordingly, there is still a desire and a need to provide a stable laundry detergent that is still suitable for use in forming dose packs or pods with a water-soluble, film-forming material, which is in direct contact with the liquid laundry detergent.

SUMMARY OF THE INVENTION

In one aspect of the present invention, an aqueous liquid detergent is provided. The aqueous detergent compositions described herein comprise a high water content (e.g., 50-65 wt. %), high carbonate builder level (e.g., 25-35 wt. % potassium carbonate), electrolyte-tolerant surfactants (e.g., 1-15 wt. %), glycerin (e.g., 1-15 wt. %), and propylene glycol diacetate (PGDA) (e.g., 1-5 wt. %). The unit dose liquid laundry formulation is enclosed in a water-soluble poly(vinyl alcohol) film, forming a unit dose liquid laundry pod. It was surprisingly discovered that the addition of propylene glycol diacetate (PGDA) in a unit dose liquid laundry formulation resulted in improved cold-water dissolution of the encapsulating/surrounding poly(vinyl alcohol) film. The formulations described herein are capable of forming a homogeneous clear or opaque formulation that does not dissolve the water-soluble poly (vinyl alcohol) (PVOH) film encapsulating the formulation prior to use.

An article is also provided herein, the article comprising an aqueous liquid detergent composition as described herein, and a package for the aqueous liquid detergent which is in direct contact with the aqueous liquid detergent, wherein the package is formed from a water-soluble, film-forming material. In some embodiments, the water-soluble film-forming material is polyvinyl alcohol.

The invention includes, without limitation, the following embodiments.

Embodiment 1: An article comprising: an aqueous liquid detergent; and a package for the aqueous liquid detergent which is in direct contact with the aqueous liquid detergent, wherein the package is formed from a water-soluble, film-forming material: wherein the aqueous liquid detergent comprises: at least about 40% by weight of water based on the total weight of the aqueous liquid detergent; a builder comprising potassium carbonate, wherein the potassium carbonate is present in an amount of at least about 25 weight percent, based on the total weight of the aqueous liquid detergent; propylene glycol diacetate; and at least one surfactant.

Embodiment 2: The article of Embodiment 1, wherein the aqueous liquid detergent further comprises at least one enzyme which is stable at an alkaline pH.

Embodiment 3: The article of any of Embodiments 1-2, wherein the aqueous liquid detergent further comprises at least one enzyme selected from the group consisting of protease, amylase, mannanase, and a combination thereof.

Embodiment 4: The article of any of Embodiments 1-3, wherein the at least one surfactant comprises: a first surfactant, wherein the first surfactant is an anionic surfactant; and a second surfactant, wherein the second surfactant is a nonionic surfactant.

Embodiment 5: The article of Embodiment 4, wherein the second surfactant is a nonionic surfactant, and wherein the second nonionic surfactant and the first anionic surfactant are present in a weight ratio of about 4:1 of nonionic surfactant to anionic surfactant, on a percent actives basis.

Embodiment 6: The article of any of Embodiments 1-4, wherein the at least one surfactant includes alkylpolyglucoside and alkyl ether sulfate.

Embodiment 7: The article of Embodiment 6, wherein the alkylpolyglucoside and alkyl ether sulfate are present in a weight ratio of about 4:1 of alkylpolyglucoside to alkyl ether sulfate.

Embodiment 8: The article of any of Embodiments 1-7, wherein the at least one surfactant is present in an amount of about 2% to about 25% percent by weight based on the total weight of the aqueous liquid detergent.

Embodiment 9: The article of any of Embodiments 1-8, wherein the at least one surfactant is present in an amount of about 1% to about 2% percent by weight based on the total weight of the aqueous liquid detergent.

Embodiment 10: The article of any of Embodiments 1-9, wherein the water is present in an amount of about 50 to about 65 weight percent, based on the total weight of the aqueous liquid detergent.

Embodiment 11: The article of any of Embodiments 1-10, wherein the aqueous liquid detergent further comprises at least one stabilizer.

Embodiment 12: The article of any of Embodiment 11, wherein the at least one stabilizer is glycerin.

Embodiment 13: The article of Embodiment 12, wherein the glycerin is present in an amount of at least about 10 weight percent based on the total weight of the aqueous liquid detergent.

Embodiment 14: The article of any of Embodiments 1-13, wherein the propylene glycol diacetate is present in an amount of about 1 weight percent to about 3 weight percent, based on the total weight of the aqueous liquid detergent.

Embodiment 15: The article of any of Embodiments 1-14, wherein the aqueous liquid detergent composition further comprises glycerin, and wherein the weight ratio of the at least one surfactant to the glycerin to the propylene glycol diacetate is about 10:80:10, based on the total weight of the at least one surfactant, the glycerin, and the propylene glycol diacetate.

Embodiment 16: The article of any of Embodiments 1-15, wherein the water-soluble film-forming material is polyvinyl alcohol.

Embodiment 17: A method of preparing an aqueous liquid detergent composition, comprising: mixing at least one surfactant with water, wherein the aqueous liquid detergent comprises at least about 40% by weight of water based on the total weight of the aqueous liquid detergent; adding propylene glycol diacetate to the mixture of the at least one surfactant and the water; adding a builder comprising potassium carbonate to the mixture of the propylene glycol diacetate, the water, and the at least one surfactant, wherein the potassium carbonate is present in an amount of at least about 25 weight percent, based on the total weight of the aqueous liquid detergent; mixing the mixture of the propylene glycol diacetate, the water, the at least one surfactant, and the builder at a temperature of at least about 30° C.; and cooling the mixture of the propylene glycol diacetate, the water, the at least one surfactant, and the builder to room temperature.

Embodiment 18: The method of Embodiment 17, further comprising encapsulating the aqueous liquid detergent composition in a package which is in direct contact with the aqueous liquid detergent, wherein the package is formed from a water-soluble, film-forming material.

These and other features, aspects, and advantages of the disclosure will be apparent from a reading of the following detailed description. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

Other aspects and advantages of the present invention will become apparent from the following.

DETAILED DESCRIPTION OF THE INVENTION

The present disclosure now will be described more fully hereinafter. The disclosure may be embodied in many different forms and should not be construed as limited to the embodiments set forth herein: rather, these embodiments are provided so that this disclosure will satisfy applicable legal requirements. Like numbers refer to like elements throughout. As used in this specification and the claims, the singular forms “a.” “an,” and “the” include plural references unless the context clearly dictates otherwise.

As described above, commercially-available unit dose laundry pods typically contain low-water content due to the water solubility of the PVOH film enclosing the formulation. In the high-water liquid formulations described herein, potassium carbonate can be used as a water-binding agent that prevents solubilization of the surrounding PVOH film. The high-water content may provide cost-saving options as water replaces expensive surfactants and solvents. However, in certain embodiments, a PVOH film exposed to a water-binding agent (e.g., potassium carbonate) did not completely dissolve in cold-water, particularly if the film was exposed to the water-binding agent for extended periods of time and/or exposed to the water-binding agent at elevated temperatures. As discussed in more detail below; it was surprisingly discovered that the addition of propylene glycol diacetate (PGDA) to the aqueous liquid detergent compositions described herein resulted in improved cold-water dissolution of the encapsulating PVOH film.

In one aspect of the present disclosure, an article is provided, the article for use in the laundry process comprising a liquid detergent and a package for the liquid detergent. More particularly, the article is an aqueous, organic solvent free, liquid laundry detergent contained in a package, preferably a pouch or packet, containing a unit dose of the liquid laundry detergent, the package comprising a water soluble film-forming material that dissolves when placed in the laundry wash water so as to release the liquid laundry detergent. As used herein, terms such as “package”. “pod”, “pouch”, and the like can be used interchangeably to describe the water-soluble film forming the article enclosing liquid laundry detergents described herein. According to the invention, the water-soluble film-forming material is in substantially direct contact with the liquid laundry detergent, with the film-forming material maintaining its structural integrity prior to external contact with an aqueous medium, such as a laundry wash liquor. The liquid detergent is capable of remaining homogeneous over a relatively wide temperature range, such as might be encountered in storage, and the pouch is capable of dissolution in water even after extended storage.

The water-soluble package of this disclosure can preferably be made from polyvinyl alcohol, but can also be cast from other water-soluble materials such as polyethylene oxide, methyl cellulose and mixtures thereof. Suitable water-soluble films are well known in the art and are commercially available from numerous sources.

In certain preferred embodiments, the water-soluble package is made from polyvinyl alcohol (PVOH). The PVOH polymer is generally prepared by hydrolysis of poly(vinyl acetate) (PVAc). The degree of hydrolysis, or the extent to which PVAc is converted to PVOH, affects the water solubility of the PVOH polymer. Partially hydrolyzed PVOH polymers (for example ~79-88% conversion of acetate) are soluble in cold water (~ 10° C.). Fully hydrolyzed PVOH polymers (for example ~98-99% conversion of acetate) are only soluble in hot water (~60° C.). In certain preferred embodiments, the PVOH films used for unit dose laundry pods of the present disclosure are cold-water soluble, so that the pod (formulation+ film) will completely dissolve during a cold-water laundry wash cycle.

The liquid laundry detergent package itself can be of any configuration, but conveniently may have a rectangular or square shape when viewed normally to the plane of its two longest dimensions. A rectangular or square packet is more easily manufactured and sealed than other configurations when using conventional packaging equipment.

The liquid laundry detergents of the present disclosure are formulated in a manner which makes them compatible with the water-soluble film for purposes of packing, shipping, storage, and use. Without being limited by theory, compatibility of the liquid laundry detergent with the water-soluble film can be achieved by the use of propylene glycol diacetate (PGDA) in the liquid laundry detergent. As described herein, embodiments of the invention relate to an aqueous liquid detergent, which can be encapsulated in a water-soluble package. In particular, various embodiments of the present invention relate to an aqueous liquid detergent comprising a water-soluble alkaline carbonate builder, propylene glycol diacetate (PGDA), at least one surfactant, and glycerin. The formulations are essentially homogenous (show substantially no phase separation) for an extended time period and temperature range. In certain embodiments, the detergent can be clear. In some embodiments, the detergents provided herein are not clear transparent liquids, but are rather turbid. Without being limited by theory, it is noted that varying the level of certain surfactant(s) (e.g., Steol®; an anionic surfactant) can affect the solubility of the carbonate builder in the detergent composition and thereby affect whether the detergent composition is clear or opaque. Similarly, certain enzymes can also affect whether the detergent composition is clear or opaque. While homogeneity of the formulations provides a desirable product appearance, phase separation can also be a product performance issue, since both phases in a phase-separated system may not disperse and dissolve rapidly during the wash cycle, although the formulation may have dispersed and dissolved rapidly before phase separation occurred.

In various embodiments, the liquid laundry detergent is a concentrated, heavy-duty liquid detergent which can contain at least about 25 weight percent of water, at least about 40 weight percent of water, or at least about 50 weight percent of water, based on the weight of the overall detergent composition. In some embodiments, water can be present in an amount of about 35 weight percent to about 70 weight percent, or about 50 weight percent to about 65 weight percent, based on the total weight of the detergent composition.

The liquid detergent compositions of the present disclosure include at least one carbonate builder. The water-soluble alkaline carbonate builder in the detergent composition (also referred to herein as a "water-binding agent") can comprise, for example, an alkali metal carbonate, bicarbonate, or sesquicarbonate (preferably sodium or potassium carbonate, bicarbonate, or sesquicarbonate), or mixtures thereof. In certain embodiments, the builder comprises potassium carbonate. The presence of the builder in the formulation renders the aqueous liquid detergent non-solubilizing relative to the water-soluble pouch (made from, for example, polyvinyl alcohol and/or polyvinyl acetate). As such, the presence of the builder results in compatibility between the pouch and the formulation by preventing the aqueous detergent from dissolving the water-soluble package the aqueous detergent is stored within. The builder (e.g., potassium carbonate) also allows for the detergent composition to comprise a higher water content than the water content of many conventional detergent packages. The high water content of the formulations of the present invention, in addition to allowing rapid dispersion and dissolution in the wash cycle, can result in a significant cost reduction, thereby making a pouch-type detergent available to the consumer at a significantly lower price.

The aqueous liquid detergents of the present disclosure can comprise a builder in an amount of about 25% to about 45% by weight, or about 30% to about 40% by weight, based on the total weight of the aqueous liquid detergent. In certain embodiments, the detergent composition can comprise a builder in an amount of at least about 25% by weight, or at least about 30% by weight, based on the total weight of the aqueous liquid detergent.

The presence of a high content of carbonate builder in the detergent composition can be effective to bind the water in the detergent composition and thereby prevent dissolution of the surrounding water-soluble PVOH film prior to use, however, the presence of the carbonate builder can also have a negative effect on the dissolution of the PVOH film during use in a cold-water laundry cycle (i.e., the film does not completely dissolve during use). Without being limited by theory, it is hypothesized that the alkalinity from the carbonate builder (e.g., potassium carbonate) contributes to further PVOH polymer hydrolysis at elevated temperatures, resulting to fully hydrolyzed PVOH that has low cold-water film solubility. It was surprisingly found that the addition of propylene glycol diacetate (PGDA) to the aqueous detergent compositions disclosed herein significantly improves the cold-water film dissolution of unit dose liquid laundry pods containing a carbonate builder (e.g., potassium carbonate). Without being limited by theory, it is hypothesized that propylene glycol diacetate hydrolyzes to acetate ions and propylene glycol in the formulation. If the PVOH polymer hydrolysis is an equilibrium process, the presence of acetate ions may shift the equilibrium process based on Le Chatelier's Principle. and consequently, inhibits the full hydrolysis of the PVOH polymer. The effect of propylene glycol diacetate was surprising and unique because another similar chemical, triacetin, is not stable in the formulation.

The aqueous liquid detergents of the present disclosure can comprise propylene glycol diacetate (PGDA) in an amount of about 0.5% to about 10% by weight, about 1% to about 5% by weight, or about 1% to about 3% by weight, based on the total weight of the aqueous liquid detergent. In certain embodiments, the detergent composition can comprise PGDA in an amount of at least about 0.5% by weight, at least about 1% by weight, or at least about 2% by weight, based on the total weight of the aqueous liquid detergent.

The presence of the builder in the detergent composition can render the composition susceptible to phase changes and separations before the composition reaches its final homogeneous form. However, the surfactants selected in embodiments of the compositions described herein (e.g., alkylpolyglucosides) are highly salt-tolerant or electrolyte-tolerant, and as such, the compositions described herein do not exhibit phase separation when the builder (e.g., potassium carbonate) is added.

Some embodiments of the aqueous liquid detergent compositions described herein can comprise at least one surfactant. For example, the detergent compositions can comprise a nonionic surfactant, an anionic surfactant, or combinations thereof. In some embodiments, it can be advantageous for a nonionic surfactant to be present in an amount of at least 50% by weight based on the total weight of surfactant employed. As is understood by those skilled in the art, nonionic surfactants lower the critical micelle concentration, and achieve superior oil removal. This ratio of 50% nonionic surfactant to total surfactant present can also act to minimize phase separation within the pouch, as well as to enhance detergency, particularly in hard water.

In various embodiments, the detergent compositions described herein comprise at least one anionic surfactant and at least one nonionic surfactant. The weight ratio of the nonionic surfactant to the anionic surfactant can be about 99:1 to about 70:30, or about 90:10 to about 75:25. In certain embodiments, the weight ratio of the nonionic surfactant to the anionic surfactant can be about 80:20, based on the percentage of each surfactant that is active. It is noted that commercially available surfactants may be diluted or mixed with additional ingredients beyond the surfactant actives (e.g., water). For consistency, the weight ratio of the surfactants is referring to the weight ratio of the surfactant actives.

In certain embodiments, the composition can comprise at least one surfactant selected from the group consisting of sodium laureth sulfate having 2-5 moles ethylene oxide (e.g., Steol® products available from Stepan Company), alkylpolyglucosides, alkyl ether sulfates, alkoxylated carboxylates, and alkyldiphenyloxide disulfonates. In certain embodiments, the aqueous liquid detergent composition can comprise Steol® (an alkyl ether sulfate, an anionic surfactant) and Glucopon (an alkylpolyglucoside, a nonionic surfactant).

In various embodiments, the total amount of active surfactants in the detergent composition (i.e., nonionic, and/or anionic surfactant) can be about 1-25 weight percent, about 1-15 weight percent, about 1-10 weight percent, about 1-5 weight percent, about 5-15 weight percent, or about 10-15 weight percent, based on the total weight of the aqueous liquid detergent. In certain embodiments, the total amount of active surfactants in the detergent composition can be at least about 1% by weight, at least about 5% by weight, at least about 10% by weight, or at least about 15% by weight based on the total weight of the aqueous liquid detergent.

In various embodiments, the liquid detergents of the present disclosure can comprise at least one enzyme. In various embodiments, the at least one enzyme can be protease, amylase, mannanase, or a combination thereof. Without being limited by theory, a high concentration of the carbonate builder (e.g., potassium carbonate) in the formulations described herein can provide a liquid formulation having a relatively high ionic strength and a highly alkaline pH (e.g., in the range of about 12-13). In certain embodiments, the liquid formulation can include at least one high-pH-stable enzyme (e.g., stable at a pH of 12-13).

The liquid detergents of the present disclosure can comprise an enzyme(s) in an amount of about 0.5% to about 5% by weight, about 1% to about 3% by weight, or about 1% to about 2% by weight, based on the total weight of the aqueous liquid detergent. In certain embodiments, the detergent composition can comprise an enzyme(s) in an amount of at least about 0.5% by weight, at least about 1% by weight, or at least about 2% by weight, based on the total weight of the aqueous liquid detergent.

In certain embodiments, the liquid detergent composition can comprise a stabilizer such as glycerin. In some embodiments, the stabilizer can be selected from the group consisting of polyethylene glycols (PEGs) (e.g., PEG 400), propylene glycols, dipropylene glycols, tripropylene glycols, 1,3-propanediol, and combinations thereof. The stabilizer can be present in an amount of about 1-25 weight percent, about 1-15 weight percent, about 1-10 weight percent, about 1-5 weight percent, about 5-15 weight percent, or about 10-15 weight percent, based on the total weight of the aqueous liquid detergent. In certain embodiments, the total amount of stabilizer(s) in the detergent composition can be at least about 1% by weight, at least about 5% by weight, at least about 10% by weight, or at least about 15% by weight based on the total weight of the aqueous liquid detergent.

Various embodiments of the detergent compositions described herein can include additional ingredients conventionally found in detergent compositions. For example, the detergent compositions can include dye(s), chelating agent (s), antiredeposition polymer(s), fluorescent whitening agent (s), fragrance(s), bittering agent(s), etc. In general, additional ingredients in the liquid detergent compositions can be present in an amount of about (0.1 to about 10 weight percent, or about 1 to about 8 weight percent. In some embodiments, additional ingredients can be present in an amount of less than about 10 weight percent, less than about 8 weight percent, less than about 5 weight percent, less than about 3 weight percent, or less than about 1 weight percent, based on the total weight of the aqueous detergent composition.

A method of preparing an aqueous liquid detergent is also provided herein. Generally, the method of preparing the detergent composition can include mixing the ingredients of the detergent composition at an elevated temperature. For example, the detergent composition can be mixed at a temperature of at least about 30° C. at least about 35° C. at least about 40° C. at least about 50° C. or at least about 60° C. After the liquid detergent mixture has cooled to room temperature (e.g., about 20-25° C.), the resulting liquid can then be enclosed into pods by heat-sealing the pod-encapsulating film. The order of addition of the ingredients of the detergent composition can be such that (1) any surfactants are first added to the water; (2) the builder (e.g., potassium carbonate) is added after the surfactants; and (3) any enzymes are added after the addition of the builder and after the cooling of the mixture after the builder is added.

In some embodiments, a method of preparing liquid detergent comprises first pre-mixing at least one surfactant such as Steol® with the water. Optionally, additional surfactants can be added. Next, additional ingredients such as a chelating agent (e.g., EDTA) and/or a bittering agent (e.g., Bitrex) can be added and mixed into the mixture. Next glycerin can be added to the mixture. Next, propylene glycol diacetate can be added to the mixture. Finally, a builder (e.g., potassium carbonate) in solid form can be added to the mixture. Next, propylene glycol diacetate can be added to the mixture. Finally, glycerin can be added to the mixture. The mixture can then be mixed at a high speed of mixing and at an elevated temperature to create a homogeneous solution. The homogeneous solution can then be cooled to room temperature, and any enzymes can be added to the cooled mixture which can then be encapsulated into a film to form a detergent pod.

In some embodiments, the method of preparing an aqueous liquid detergent can further include preparing a detergent article by placing a measured amount of the aqueous liquid detergent into a package for the aqueous liquid detergent. As discussed in more detail above, the package can be in direct contact with the aqueous liquid detergent. Furthermore, the package can be formed from a water-soluble, film-forming material, however, the film-forming material is insoluble with respect to the aqueous liquid detergent contained within the package. After placing a measured amount of the aqueous liquid detergent into the package, the water-soluble, film forming material of the package can be heat sealed in order to close the detergent within the package.

EXPERIMENTAL

Example 1

A unit dose of liquid laundry detergent according to the present disclosure was prepared.

The liquid formula was prepared by first slowly adding the ingredients listed in Table 1 below in a beaker containing the water with an overhead mixer set at 500 RPM. The mixture was mixed at a mixer speed at 500 RPM. The resulting liquid was enclosed in pods by heat-sealing PVOH film. Table 1 below is an example formulation of the liquid laundry detergent.

TABLE 1

Unit Dose of Laundry Detergent Formulation Comprising Propylene Glycol Diacetate

| Ingredient | Weight % |
|---|---|
| Water | 50-65% |
| Propylene Glycol Diacetate | 1-3% |
| Glycerine | 10-15% |
| Alkyl ether sulfate | 0.1-1.5% |
| Alkylpoly glucoside | 1-3% |
| Potassium Carbonate | 25-35% |
| Dye | 0.01-0.1% |
| Totals | 100 |

Example 2

Propylene glycol diacetate (PGDA) and triacetin were separately screened for compatibility with 30 w/w % potassium carbonate, 5 w/w % surfactant and 55 w/w % water. A ternary phase composition study was conducted for each chemical to identify the formulations that remained clear and no phase separation.

A surfactant solution (A) was first prepared separately in a beaker wherein 4 g (actives) alkylpolyglucoside and 1 g (actives) alkyl ether sulfate was dissolved in 87.65 g water. In each of 44 test tubes, 5.5 g of water was added. Using transfer pipettes, aliquots of A (surfactants), B (glycerin) & C (PGDA or Triacetin) were added into the test tubes in varying combinations following Table 1 below: The test tubes were vortexed to mix. Each test tube was then added with potassium carbonate (3 g), and was vortexed to mix. Table 2 below shows the weight percentages of A, B and C in each test tube.

TABLE 2

| Ternary Phase Composition Study | | | |
|---|---|---|---|
| Test Tube | Wt % A | Wt % B | Wt % C |
| 1 | 80 | 20 | 0 |
| 2 | 60 | 40 | 0 |
| 3 | 40 | 60 | 0 |
| 4 | 20 | 80 | 0 |
| 5 | 90 | 0 | 10 |
| 6 | 80 | 10 | 10 |
| 7 | 70 | 20 | 10 |
| 8 | 50 | 40 | 10 |
| 9 | 30 | 60 | 10 |
| 10 | 10 | 80 | 10 |
| 11 | 0 | 90 | 10 |
| 12 | 80 | 0 | 20 |
| 13 | 60 | 20 | 20 |
| 14 | 40 | 40 | 20 |
| 15 | 20 | 60 | 20 |
| 16 | 0 | 80 | 20 |
| 17 | 70 | 0 | 30 |
| 18 | 60 | 10 | 30 |
| 19 | 50 | 20 | 30 |
| 20 | 35 | 35 | 30 |
| 21 | 20 | 50 | 30 |
| 22 | 10 | 60 | 30 |
| 23 | 0 | 70 | 30 |
| 24 | 60 | 0 | 40 |
| 25 | 50 | 10 | 40 |
| 26 | 30 | 30 | 40 |
| 27 | 10 | 50 | 40 |
| 28 | 0 | 60 | 40 |
| 29 | 50 | 0 | 50 |
| 30 | 40 | 10 | 50 |
| 31 | 25 | 25 | 50 |
| 32 | 10 | 40 | 50 |
| 33 | 0 | 50 | 50 |
| 34 | 30 | 10 | 60 |
| 35 | 20 | 20 | 60 |
| 36 | 10 | 30 | 60 |
| 37 | 30 | 0 | 70 |
| 38 | 15 | 15 | 70 |
| 39 | 0 | 30 | 70 |
| 40 | 20 | 0 | 80 |
| 41 | 10 | 10 | 80 |
| 42 | 0 | 20 | 80 |
| 43 | 10 | 0 | 90 |
| 44 | 0 | 10 | 90 |

All test tubes with triacetin showed phase separation. Only test tubes 9 and 10 of the formulations containing propylene glycol diacetate (PGDA) showed phase stability and were clear liquid formulations.

Example 3

Film dissolution in cold water was tested. A detergent formulation having the general formula according to Example 1 above was prepared.

Based from the phase composition studies from Example 2 above, formulations containing PGDA, according to test tube 9 & test tube 10, were remade into bigger batches (2500-g). Clear liquid formulation aliquots (20-g) were enclosed in poly(vinyl alcohol) film (Monosol® M8312) using a simple Uline® heat sealer, forming unit dose pods. The pods were placed in a 60° C. oven. At specific time intervals, the pods were removed from the oven, were allowed to cool to room temperature, and were tested for film dissolution in cold water.

For each pod, the PVOH film was separated from the liquid formulation. In a 600-mL beaker, 500 mL of cold water (10° C.) was added with a stir bar. The beaker was placed on a magnetic stir plate and the water is stirred to obtain roughly a 1-inch deep vortex. A thermocouple probe was immersed in the beaker to monitor water temperature. The film was attached to a binder clip that was held in place with a clamp connected to a stand. As soon as the film was immersed in the cold water, the timer was started. The time it took for the film to break, and the time for complete film dissolution, were recorded.

Complete PVOH film dissolution in 10° C. cold water should be within 10 minutes to be considered as passing. If film dissolution took longer than 10 minutes, it was recorded as "FAIL." Previously, when pods containing potassium carbonate were subjected to 60° C., the PVOH films from the pods all failed cold-water film dissolution testing.

By contrast, the formulation corresponding to test tube 10 in Example 2 above, which contained PGDA, showed significant (only 5 failures) passing film dissolution data across 44 samples tested. The time for complete dissolution of the passing samples ranged from 4.32 minutes to 10 minutes.

Many modifications and other embodiments of the disclosure will come to mind to one skilled in the art to which this disclosure pertains having the benefit of the teachings presented in the foregoing description; and it will be apparent to those skilled in the art that variations and modifications of the present disclosure can be made without departing from the scope or spirit of the disclosure. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An article comprising:

an aqueous liquid detergent; and a package for the aqueous liquid detergent which is in direct contact with the aqueous liquid detergent, wherein the package is formed from a water-soluble, film-forming material;

wherein the aqueous liquid detergent comprises:

at least about 40% by weight of water based on the total weight of the aqueous liquid detergent;

a builder comprising potassium carbonate, wherein the potassium carbonate is present in an amount of at least about 25 weight percent, based on the total weight of the aqueous liquid detergent;

propylene glycol diacetate; and at least one surfactant.

2. The article of claim 1, wherein the aqueous liquid detergent further comprises at least one enzyme which is stable at an alkaline pH.

3. The article of claim 1, wherein the aqueous liquid detergent further comprises at least one enzyme selected from the group consisting of protease, amylase, mannanase, and a combination thereof.

4. The article of claim 1, wherein the at least one surfactant comprises:

a first surfactant, wherein the first surfactant is an anionic surfactant; and a second surfactant, wherein the second surfactant is a nonionic surfactant.

5. The article of claim 4, wherein the second surfactant is a nonionic surfactant, and wherein the second nonionic surfactant and the first anionic surfactant are present in a weight ratio of about 4:1 of nonionic surfactant to anionic surfactant, on a percent actives basis.

6. The article of claim 1, wherein the at least one surfactant includes alkylpolyglucoside and alkyl ether sulfate.

7. The article of claim 6, wherein the alkylpolyglucoside and alkyl ether sulfate are present in a weight ratio of about 4:1 of alkylpolyglucoside to alkyl ether sulfate.

8. The article of claim 1, wherein the at least one surfactant is present in an amount of about 2% to about 25% percent by weight based on the total weight of the aqueous liquid detergent.

9. The article of claim 1, wherein the at least one surfactant is present in an amount of about 1% to about 2% percent by weight based on the total weight of the aqueous liquid detergent.

10. The article of claim 1, wherein the water is present in an amount of about 50 to about 65 weight percent, based on the total weight of the aqueous liquid detergent.

11. The article of claim 1, wherein the aqueous liquid detergent further comprises at least one stabilizer.

12. The article of claim 11, wherein the at least one stabilizer is glycerin.

13. The article of claim 12, wherein the glycerin is present in an amount of at least about 10 weight percent based on the total weight of the aqueous liquid detergent.

14. The article of claim 1, wherein the propylene glycol diacetate is present in an amount of about 1 weight percent to about 3 weight percent, based on the total weight of the aqueous liquid detergent.

15. The article of claim 1, wherein the aqueous liquid detergent composition further comprises glycerin, and wherein the weight ratio of the at least one surfactant to the glycerin to the propylene glycol diacetate is about 10:80:10, based on the total weight of the at least one surfactant, the glycerin, and the propylene glycol diacetate.

16. The article of claim 1, wherein the water-soluble film-forming material is polyvinyl alcohol.

17. A method of preparing an aqueous liquid detergent composition, comprising:

mixing at least one surfactant with water, wherein the aqueous liquid detergent comprises at least about 40% by weight of water based on the total weight of the aqueous liquid detergent;

adding propylene glycol diacetate to the mixture of the at least one surfactant and the water;

adding a builder comprising potassium carbonate to the mixture of the propylene glycol diacetate, the water, and the at least one surfactant, wherein the potassium carbonate is present in an amount of at least about 25 weight percent, based on the total weight of the aqueous liquid detergent;

mixing the mixture of the propylene glycol diacetate, the water, the at least one surfactant, and the builder at a temperature of at least about 30° C.;

cooling the mixture of the propylene glycol diacetate, the water, the at least one surfactant, and the builder to room temperature.

18. The method of claim 17, further comprising encapsulating the aqueous liquid detergent composition in a package which is in direct contact with the aqueous liquid detergent, wherein the package is formed from a water-soluble, film-forming material.

* * * * *